US012592994B2

(12) United States Patent
Eagan

(10) Patent No.: US 12,592,994 B2
(45) Date of Patent: Mar. 31, 2026

(54) REAL-TIME USER SCREENING OF MESSAGES WITHIN A COMMUNICATION PLATFORM

(71) Applicant: Zoom Communications, Inc., San Jose, CA (US)

(72) Inventor: Jeffrey Allen Eagan, Longmont, CO (US)

(73) Assignee: Zoom Communications, Inc., San Jose, CA (US)

( * ) Notice: Subject to any disclaimer, the term of this patent is extended or adjusted under 35 U.S.C. 154(b) by 152 days.

(21) Appl. No.: 17/878,004

(22) Filed: Jul. 31, 2022

(65) Prior Publication Data

US 2024/0040036 A1 Feb. 1, 2024

(51) Int. Cl.
*H04M 3/436* (2006.01)
*H04M 3/533* (2006.01)

(52) U.S. Cl.
CPC ........... *H04M 3/436* (2013.01); *H04M 3/533* (2013.01)

(58) Field of Classification Search
CPC .............................. H04M 3/436; H04M 3/533
USPC ........................................................ 379/88.07
See application file for complete search history.

(56) References Cited

U.S. PATENT DOCUMENTS

| | | | | |
|---|---|---|---|---|
| 6,415,020 B1 * | 7/2002 | Pinard | ................. | H04M 1/2478 |
| | | | | 379/202.01 |
| 6,661,886 B1 * | 12/2003 | Huart | ...................... | H04M 1/65 |
| | | | | 379/215.01 |
| 8,957,936 B2 * | 2/2015 | Grevers, Jr. | ............. | H04N 7/14 |
| | | | | 348/14.08 |
| 10,057,396 B2 * | 8/2018 | Kärkkäinen | ...... | H04M 3/42068 |
| 2003/0053612 A1 * | 3/2003 | Henrikson | .......... | H04L 12/1818 |
| | | | | 379/202.01 |
| 2006/0244818 A1 * | 11/2006 | Majors | ................ | H04L 65/4038 |
| | | | | 348/E7.083 |
| 2007/0195158 A1 * | 8/2007 | Kies | ....................... | H04N 7/147 |
| | | | | 348/E7.081 |
| 2009/0028304 A1 * | 1/2009 | Burckart | ............. | H04M 3/4288 |
| | | | | 379/88.23 |
| 2009/0086953 A1 * | 4/2009 | Vendrow | ............... | H04W 40/00 |
| | | | | 379/207.02 |
| 2009/0217365 A1 * | 8/2009 | Daigle | ............... | H04N 21/4882 |
| | | | | 709/206 |
| 2010/0035594 A1 * | 2/2010 | Vendrow | ........... | H04M 3/53308 |
| | | | | 455/417 |
| 2010/0091956 A1 * | 4/2010 | Gopal | ................... | H04M 3/533 |
| | | | | 379/88.12 |

(Continued)

*Primary Examiner* — Binh Kien Tieu

(57) ABSTRACT

Methods and systems provide for real-time user screening of messages within a communication platform. In one embodiment, the system presents, to a first user, a notification of an incoming call from a second user and options for managing the call; receives, from the first client device, a selection of an option to screen the call; in response to the first user selecting to screen the call, presents, to the second user, a prompt for capturing a message; presents a message to the first user; while the message is being presented to the first user, presents, to the first user, a second set of options; and if the system determines that a selection has been made of an option to interrupt the message to accept the call: stops both capture of the message and playback of the message, and presents a digital call between the first and second users.

20 Claims, 5 Drawing Sheets

(56)  References Cited

U.S. PATENT DOCUMENTS

| 2010/0111270 A1* | 5/2010 | Langos | H04M 3/533 |
| | | | 379/88.14 |
| 2015/0248389 A1* | 9/2015 | Kahn | H04L 51/18 |
| | | | 715/230 |
| 2016/0063612 A1* | 3/2016 | Lopez | G06Q 30/0641 |
| | | | 455/414.1 |
| 2017/0192950 A1* | 7/2017 | Gaither | G10L 15/22 |
| 2017/0357390 A1* | 12/2017 | Alonso Ruiz | G06F 3/0482 |
| 2021/0289166 A1* | 9/2021 | Ahn | H04L 51/212 |
| 2022/0343259 A1* | 10/2022 | Center | G06Q 10/1093 |
| 2023/0291830 A1* | 9/2023 | Wang | H04M 3/42042 |
| 2023/0376557 A1* | 11/2023 | Mancuso | G06F 3/04842 |

* cited by examiner

100

150

102

PROCESSING ENGINE

NOTIFICATION MODULE
152

SELECTION MODULE
154

PROMPTING MODULE
156

MESSAGE MODULE
158

OPTIONS MODULE
160

ACCEPTANCE MODULE
162

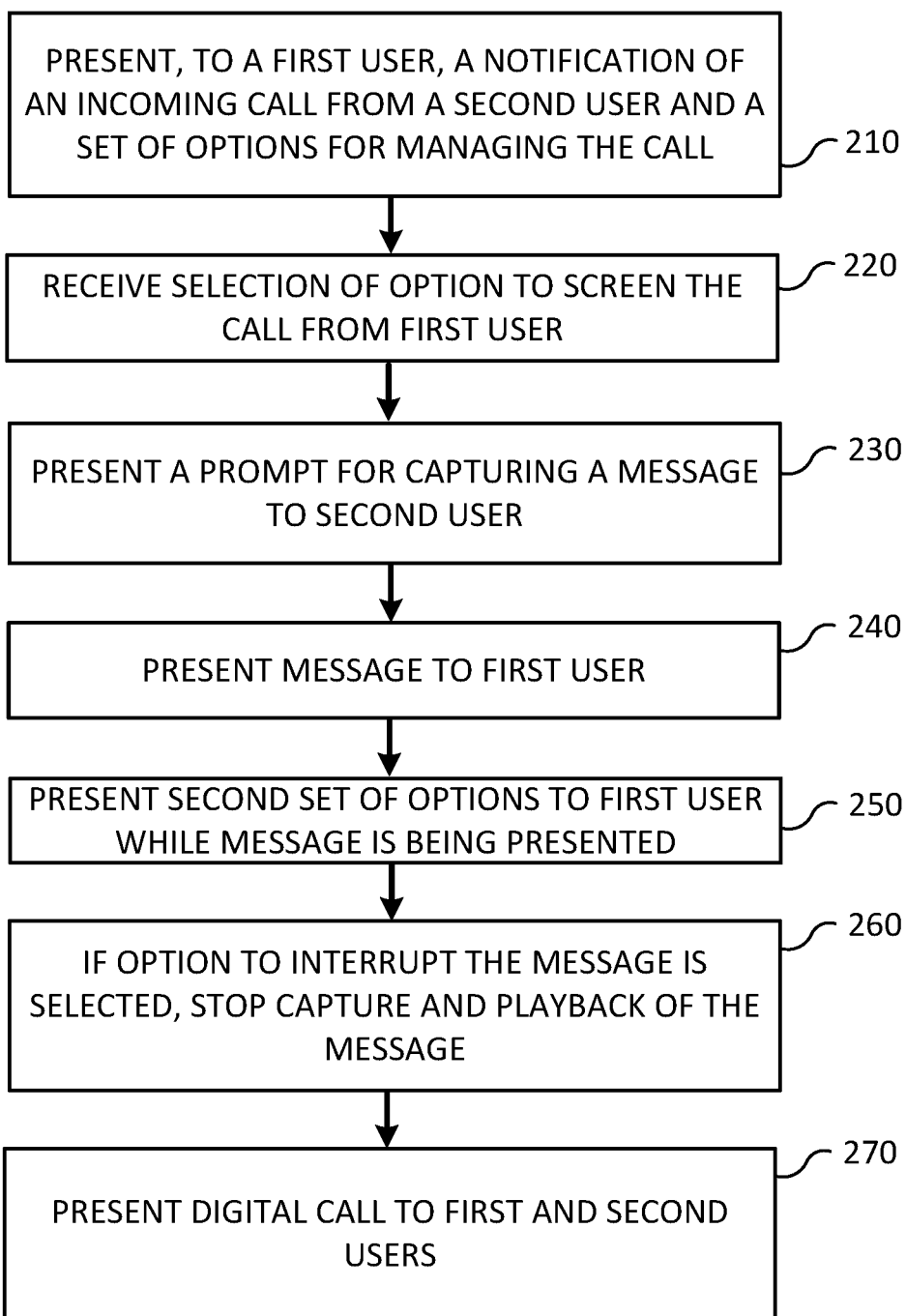

PRESENT, TO A FIRST USER, A NOTIFICATION OF AN INCOMING CALL FROM A SECOND USER AND A SET OF OPTIONS FOR MANAGING THE CALL ⟋ 210

RECEIVE SELECTION OF OPTION TO SCREEN THE CALL FROM FIRST USER ⟋ 220

PRESENT A PROMPT FOR CAPTURING A MESSAGE TO SECOND USER ⟋ 230

PRESENT MESSAGE TO FIRST USER ⟋ 240

PRESENT SECOND SET OF OPTIONS TO FIRST USER WHILE MESSAGE IS BEING PRESENTED ⟋ 250

IF OPTION TO INTERRUPT THE MESSAGE IS SELECTED, STOP CAPTURE AND PLAYBACK OF THE MESSAGE ⟋ 260

PRESENT DIGITAL CALL TO FIRST AND SECOND USERS ⟋ 270

FIG. 2

REAL-TIME USER SCREENING OF MESSAGES WITHIN A COMMUNICATION PLATFORM

FIELD

The present application relates generally to digital communication, and more particularly, to systems and methods for providing real-time user screening of messages within a communication platform.

SUMMARY

The appended claims may serve as a summary of this application.

BRIEF DESCRIPTION OF THE DRAWINGS

The present disclosure will become better understood from the detailed description and the drawings, wherein:

FIG. 2 is a flow chart illustrating an exemplary method that may be performed in some embodiments.

DETAILED DESCRIPTION OF THE DRAWINGS

Figure 1A:
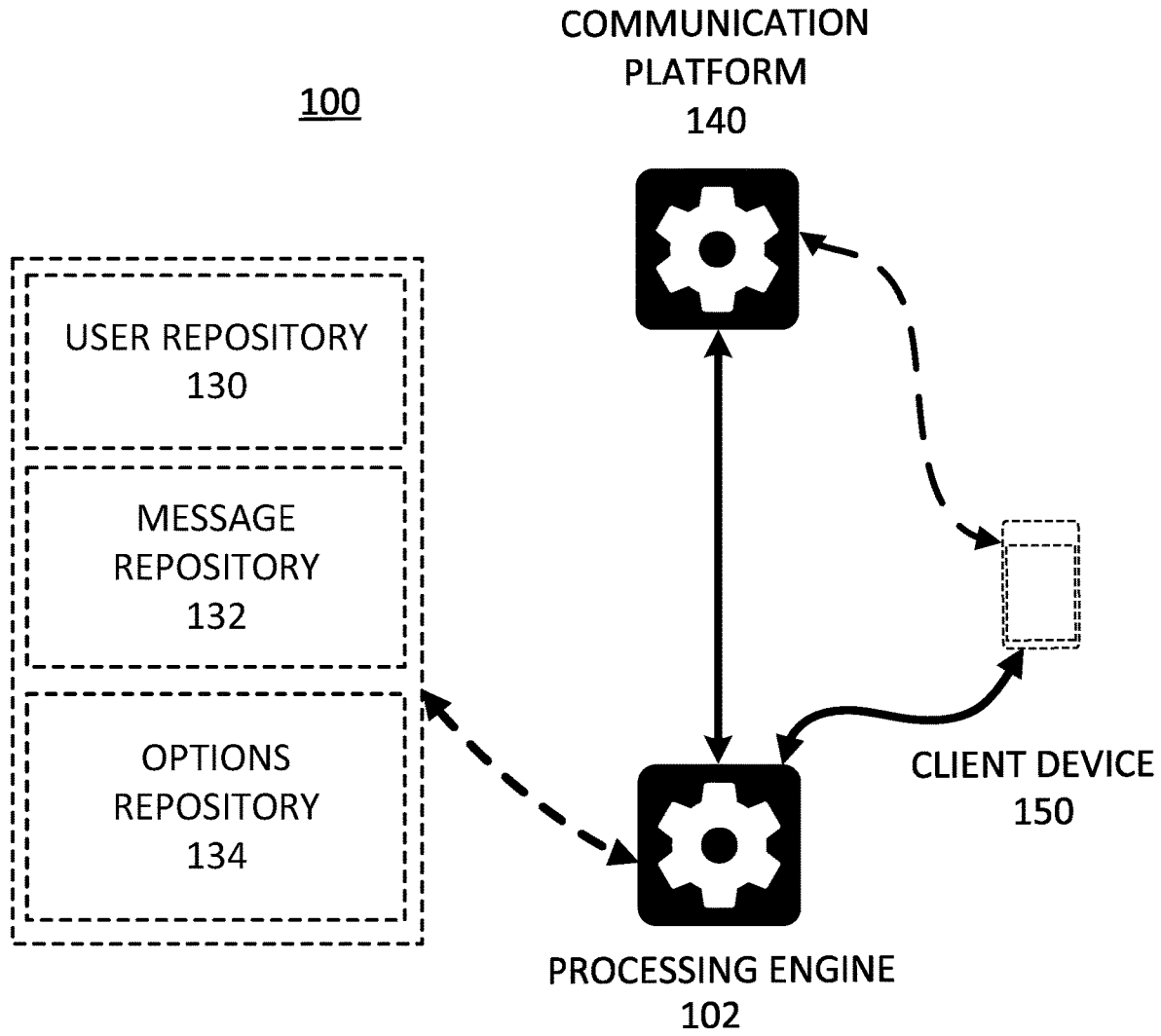
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

While modern remote communication platforms are often known for their ability for users to establish and hold meetings, conferences, and other video calls, some platforms allow for a variety of applications including, e.g., phone, video, conferencing, and chat features, in a unified way. For example, a platform may allow a user to seamlessly make and receive phone calls, share content, participate in video meetings, and send chat messages, all from a unified user interface presented on a client device (via, e.g., a desktop or mobile application). In some platforms, a user's direct phone number may be assigned to their account, such that they may make and receive phone calls as digital audio calls on the platform, receive voicemail messages to be played back as digital audio, and elevate calls to video meetings, among many other features.

However, one convenience of older phone technology is currently not implemented in such digital audio calls. With older physical answering machines, a user had the ability to "screen" phone calls, i.e., they would be able to hear an answering machine message in real time and, if they choose, intercept it by picking up the phone receiver and continuing the conversation. Thus, a user listening to an answering machine message being recorded may accept the call at any time and begin talking to the person. Voicemail as implemented in smartphones and digital audio calls are lacking such a screening feature, whereby a person could listen in to the voicemail in real time as it is being recorded, interrupt the voicemail, and communicate with the person.

Thus, there is a need in the field of digital communication tools and platforms to create new and useful systems and methods for providing screening of digital voicemail within a communication platform. The inventors have identified an absence in the current field of art of the ability to provide real-time playback and screening of digital voicemail as it is being recorded, with the ability to accept or reject the call in real time during playback of the voicemail.

In one embodiment, the system presents, to a first user of a first client device capable of receiving digital calls, a notification of an incoming call from a second user of a second client device and a set of options for managing the call; receives, from the first client device, a selection of an option to screen the call; in response to the first user selecting to screen the call, presents, to the second user at the second client device, a prompt for capturing a message; presents a message to the first user as the second client device captures the message from the second user; while the message is being presented to the first user, presents, to the first user, a second set of options including one or more of: interrupting the message to accept the call, and interrupting the message to reject the call; and if the system determines that a selection has been made of the option to interrupt the message to accept the call: stops both capture of the message and playback of the message, and presents, to the first and second users at the first and second client devices, a digital call between the first and second users.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., a user repository 130, message repository 132, and/or an options repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

In an embodiment, the processing engine 102 may perform the exemplary method of FIG. 2 or other method herein and, as a result, provide real-time user screening of messages within a communication platform. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include a user repository 130, message repository 132, and/or options repository 134. The optional repositories function to store and/or maintain, respectively, information on users of the communication platform; messages from one user to another; and options which can be presented to participants via the UI displayed on their client device. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
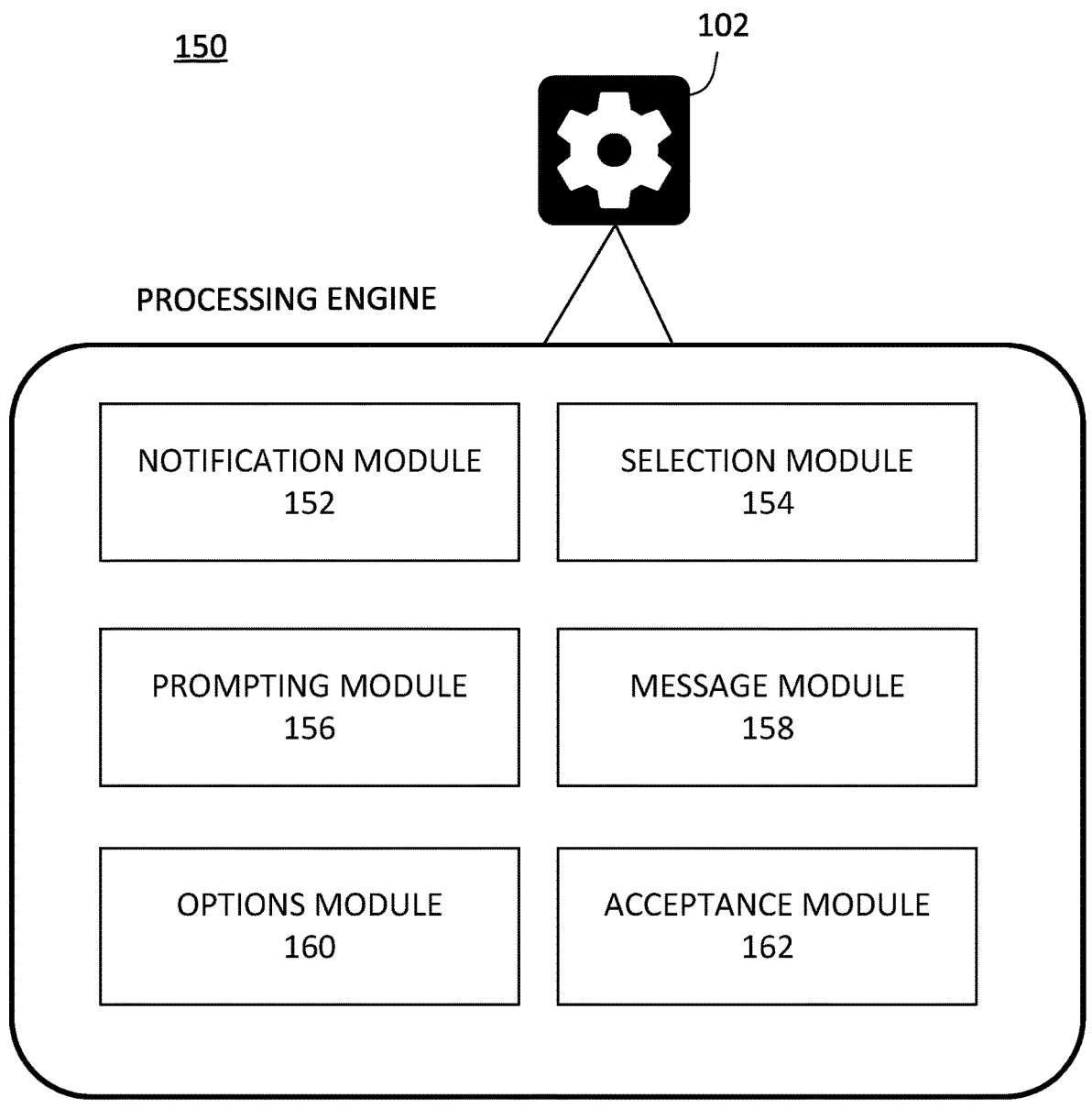
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Notification module 152 functions to present, to a first user of a first client device capable of receiving digital calls, a notification of an incoming call from a second user of a second client device and a set of options for managing the call.

Selection module 154 functions to receive, from the first client device, a selection of an option to screen the call.

Prompting module 156 functions to, in response to the first user selecting to screen the call, present, to the second user at the second client device, a prompt for capturing a message.

Message module 158 functions to present a message to the first user as the second client device captures the message from the second user.

Options module 160 functions to, while the message is being presented to the first user, present, to the first user, a second set of options including one or more of: interrupting the message to accept the call, and interrupting the message to reject the call;

Acceptance module 162 functions to, if the system determines that a selection has been made of the option to interrupt the message to accept the call: stop both capture of the message and playback of the message, and present, to the first and second users at the first and second client devices, a digital call between the first and second users.

The above modules and their functions will be described in further detail in relation to an exemplary method below.

FIG. 2 is a flow chart illustrating an exemplary method that may be performed in some embodiments.

At step 210, the system presents, to a first user of a first client device capable of receiving digital calls, a notification of an incoming call from a second user of a second client device and a set of options for managing the call. In some embodiments, the first client device and the second client device are configured to initiate and receive digital calls using a real-time communication protocol. This real-time communication protocol may be Real-Time Messaging Protocol ("RTMP") or some other suitable protocol. The protocol may be a streaming protocol for delivering media over a web framework, allowing for streaming of audio, video, and/or other media. In various embodiments, the call includes audio media, video media, both audio and video media, or any other suitable media or combination thereof.

In some embodiments, the notification of the digital call is received on the first client device via a user interface ("UI") presented to the user for the call. The UI may include a message that a call has been received, and a name and/or number pertaining to the second user who initiated the call. In some embodiments, the set of options for managing the call takes the visual form of a number of interactive UI elements, such as message boxes or other options which the user may click on, tap, or otherwise interact with.

In some embodiments, the options presented to the user include options to accept and/or reject the call. Additionally, one of the options presented to the user is an option to screen the call or otherwise hold off on answering the call until a message is received. In some embodiments, an option to send the call to a recording service may be presented. Upon a user selecting this option, the call may be forwarded directly to a recording service which prompts the second user to record a message, such as in step 230. In some embodiments, without selecting this option, the call will continue to ring or wait for an answer while the second user waits for either the first user to pick up, select an option, or the system to move to a next step of the call flow when neither take place. An example of a UI with a notification of a call and a set of options is described below with respect to FIG. 3.

Figure 3:
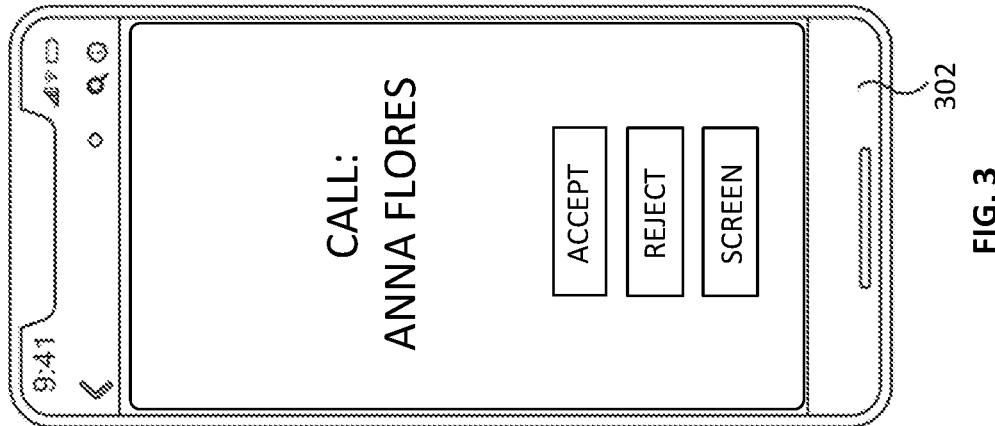
FIG. 3 is a flow chart illustrating one example embodiment of a notification of a call with a set of options presented to a user.

FIG. 3 is a flow chart illustrating one example embodiment of a notification of a call with a set of options presented to a user. In the illustrated example, a smartphone 302 is being used as a first client device. The smartphone has received a signal of an incoming digital call, and has notified a first user associated with the smartphone of the incoming call. The UI includes the name of the second user who initiated the incoming call, which is shown as "Anna Flores" in the illustrated. A set of options is included in the UI for managing the call. The options in the illustration include "ACCEPT", "REJECT", and "SCREEN", as described above with respect to FIG. 2, step 210.

Returning to FIG. 2, at step 220, the system receives, from the first client device, a selection of an option to screen the call. The system may receive this selection of the option due to the user interacting with the UI element for that option by clicking, tapping, or otherwise performing an interaction with that element understood by the system. "Screening" the call, as an option, entails the first user requesting to have the system prompt the second user to record a message, which is played back in real time to the first user. The user may then have the option to accept or reject the call while the message is being recorded and played back. This option will be explored in further detail in the steps below.

At step 230, the system, in response to the first user selecting to screen the call, presents, to the second user at the second client device, a prompt for capturing a message. In some embodiments, the prompt for capturing a message is visually presented on the second client device via a UI presented to the second user. In some embodiments, the prompt is presented as an audio prompt to the user via audio output of the second client device. The prompt may include, for example, a request to leave a message for the first user after a tone (e.g., a "beep" or other short tone) is played.

In some embodiments, concurrent to presenting the prompt for capturing the message to the second user at the second client device, presenting a notification to the first user that the prompt is playing for the second user. That is, after the first user selects the option to screen the call, the first user may be notified that the second user is in the process of recording a message. The notification may be delivered visually on the UI, via audio, or in some other suitable fashion.

In various embodiments, the message includes audio media, video media, both audio and video media, or any other suitable media or combination thereof. For example, in some embodiments, the message may be in the format of voicemail, such as the voicemail that a user may receive from calls on a smartphone. In other embodiments, the message may be in the form of a video mail where both audio and video are presented of the second user to be delivered to the first user. Any other suitable message in a suitable format may be received.

At step 240, the system presents a message to the first user as the second client device captures the message from the second user. The second user has at least started recording the message in response to the prompt in step 230. Upon the second user starting to record, the first user is presented with the message in real time while the message is in the process of being recorded.

In some embodiments, presenting the message to the first user as it is being captured at the second device is performed at least in part using a Private Branch Exchange ("PBX") system. Such a PBX system functions to allow the redirection of a media stream into the client while it is being recorded. In some embodiments, the PBX system hands off the message to a recording service which handles the recording of the message to one or more message files, plays back the message files to the first user in real time, and stores the message files on one or more servers. In some embodiments, the system captures a media stream of the message, duplicates the media stream in real time, and presents the duplicated media stream to the first user at the first device in real time.

In some embodiments, the presentation of the message to the first user includes playing back media of the message to the first user at the first device as it is being captured at the second device. In some embodiments, the system presents the first user with one or more user interface ("UI") components for playing back at least a subset of the message. In various embodiments, different playback elements may be presented to the user as interactive UI elements, such as, e.g., elements to play, pause, stop, transcribe, save the message for later, delete the message, and/or other suitable elements.

In some embodiments, as the message is being captured at the second device, the system generates, in real time, a transcript of the message; and presents, in real time, the transcript of the message to the first user at the first device. In some embodiments, this occurs upon the user selecting a "transcribe" or similar component during playback or in a settings page during or before playback, while in other embodiments, the transcription occurs automatically as a result of the user's existing preferences or settings parameters.

At step 250, while the message is being presented to the first user, the system presents, to the first user, a second set of options including one or more of: interrupting the message to accept the call, and interrupting the message to reject the call. Both of these options represent a continuation of the "screening" flow for the first user to screen the call by hearing the message and deciding whether to accept or reject the call while the message is being played. In some embodiments, if no option is selected, then the message may be saved for later viewing automatically and the call may end.

In some embodiments, the set of options includes an option to transfer the call to a third party, such as when the user wishes to forward the call to a secretary or other personnel for receiving calls on the user's behalf, or wishes to forward the call to a third party forwarding service. In some embodiments, the set of options includes an option to start a conference call by including one or more additional parties to join the call. In some embodiments, the set of options includes an option to report a call to one or more authorities, such as when there is a harassing or disturbing message that the first user has received. In some embodiments, an option may be present to transfer the call to the one or more authorities. In some embodiments, the set of options includes an option to add the call to a block list. In some embodiments, the set of options includes an option to flag the call as a spam or fraud call, or an option to detect whether the call is spoofing a valid phone number, in order to, for example, block or automatically reject unwanted calls to consumers.

In some embodiments, the second set of options includes one or more options to: interrupt the message to reject the call and delete the message, interrupt the message to reject the call and save the message, interrupt the message to accept the call and delete the message, and/or interrupt the message to accept the call and delete the message. Thus, there may be multiple options present to either accept or reject, and either save the message for later playback or delete the message.

In some embodiments, if the system determines that a selection has been made of the option to interrupt the message to reject the call, then the system stops playback of the message to the first user, and disengages the user from the screening of the message and the notification of the incoming call. In some embodiments, the system stops the capture of the message upon the second user completing the capturing of the message. In some embodiments, the system notifies the user of an option to be presented with at least the remainder of the message.

In some embodiments, the system bypasses the second plurality of options to automatically reject the call based on one or more rejection criteria. This provides some options for automatically rejecting the call without the user manually needing to select any option. In some embodiments, one of the rejection criteria includes identifying a preference of the first user to reject all calls comprising one or more specified attributes. In some embodiments, the specified attributes include one or more of: the phone number associated with the call being on a list of phone numbers to automatically reject; the area code associated with the call being on a list of area codes to automatically reject; and the call being determined to meet or exceed a confidence threshold for being classified as spam, fraud, or a spoofed call.

At step 260, if the system determines that a selection has been made of the option to interrupt the message to accept the call, the system stops both capture of the message and playback of the message, and at step 270, presents, to the first and second users at the first and second client devices, a digital call between the first and second users. In some embodiments, the digital call between the first and second users is presented with a default call establishment using a standard call protocol. For example, in some embodiments, whatever call flow would have taken place had the message not been received, is still established as the call flow. A default call establishment may be a generally standard call flow, for example, where a conversation continues until one part or the other disconnects, whereby if only one party remains, then the system disengages and terminates the call. In some embodiments, a standard call flow may allow options to escalate the call to a video meeting, or other options as suitable or allowed within the communication platform.

Figure 4:
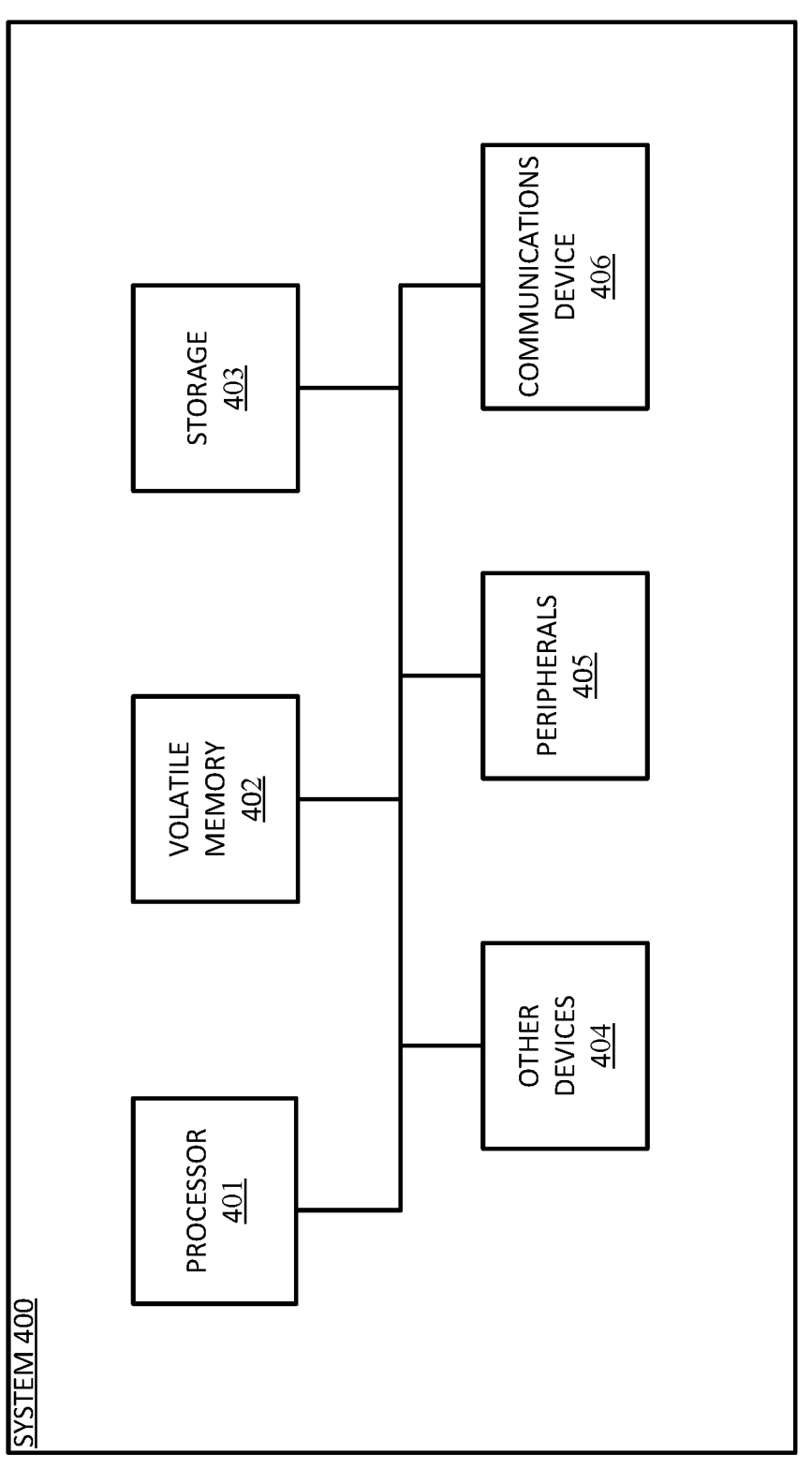
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

It will be appreciated that the present disclosure may include any one and up to all of the following examples.

Example 1. A method comprising: presenting, to a first user of a first client device capable of receiving digital calls, a notification of an incoming call from a second user of a second client device and a plurality of options for managing the call; receiving, from the first client device, a selection of an option to screen the call; in response to the first user selecting to screen the call, presenting, to the second user at the second client device, a prompt for capturing a message; presenting a message to the first user as the second client device captures the message from the second user; while the message is being presented to the first user, presenting, to the first user, a second plurality of options comprising one or more of: interrupting the message to accept the call, and interrupting the message to reject the call; and if the system determines that a selection has been made of the option to interrupt the message to accept the call: stopping both capture of the message and playback of the message, and presenting, to the first and second users at the first and second client devices, a digital call between the first and second users.

Example 2. The method of example 1, wherein the call comprises one or more of audio and video media, and the message comprises one or more of audio and video media.

Example 3. The method of any of examples 1-2, wherein the digital call between the first and second users is presented with a default call establishment using a standard call protocol.

Example 4. The method of any of examples 1-3, wherein the second plurality of options comprises one or more options to: transfer the call to a third party, start a conference call, report a call to one or more authorities, add the call to a block list, and flag the call as a spam or fraud call.

Example 5. The method of any of examples 1-4, further comprising: if the system determines that a selection has been made of the option to interrupt the message to reject the call: stopping playback of the message to the first user, and disengaging the user from the screening of the message and the notification of the incoming call.

Example 6. The method of example 5, further comprising: stopping the capture of the message upon the second user completing the capturing of the message.

Example 7. The method of example 6, further comprising: notifying the user of an option to be presented with at least the remainder of the message.

Example 8. The method of any of examples 1-7, wherein presenting the message to the first user comprises playing back media of the message to the first user at the first device as it is being captured at the second device.

Example 9. The method of any of examples 1-8, wherein presenting the message to the first user comprises, as the message is being captured at the second device: generating, in real time, a transcript of the message; and presenting, in real time, the transcript of the message to the first user at the first device.

Example 10. The method of any of examples 1-9, further comprising: concurrent to presenting the prompt for capturing the message to the second user at the second client device, presenting a notification to the first user that the prompt is playing for the second user.

Example 11. The method of any of examples 1-10, wherein the second plurality of options further comprises one or more options to: interrupt the message to reject the call and delete the message, interrupt the message to reject the call and save the message, interrupt the message to accept the call and delete the message, and interrupt the message to accept the call and delete the message.

Example 12. The method of any of examples 1-11, wherein presenting the message to the first user as it is being captured at the second device is performed at least in part using a Private Branch Exchange (PBX) system.

Example 13. The method of any of examples 1-12, further comprising: capturing a media stream of the message; duplicating the media stream in real time; and presenting the duplicated media stream to the first user at the first device in real time.

Example 14. The method of any of examples 1-13, further comprising: bypassing the second plurality of options to automatically reject the call based on one or more rejection criteria.

Example 15. The method of example 14, wherein one of the rejection criteria comprises identifying a preference of the first user to reject all calls comprising one or more specified attributes.

Example 16. The method of example 15, wherein the specified attributes comprise one or more of: the phone number associated with the call being on a list of phone numbers to automatically reject; the area code associated with the call being on a list of area codes to automatically reject; and the call being determined to meet or exceed a confidence threshold for being classified as spam, fraud, or a spoofed call.

Example 17. The method of any of examples 1-16, further comprising: presenting the first user with one or more user interface (UI) components for playing back at least a subset of the message.

Example 18. The method of any of examples 1-17, wherein the first device and the second device are configured to initiate and receive digital calls using a real-time communication protocol.

Example 19. A communication system comprising one or more processors configured to perform the operations of: presenting, to a first user of a first client device capable of receiving digital calls, a notification of an incoming call from a second user of a second client device and a plurality of options for managing the call; receiving, from the first client device, a selection of an option to screen the call; in response to the first user selecting to screen the call, presenting, to the second user at the second client device, a prompt for capturing a message; presenting a message to the first user as the second client device captures the message from the second user; while the message is being presented to the first user, presenting, to the first user, a second plurality of options comprising one or more of: interrupting the message to accept the call, and interrupting the message to reject the call; and if the system determines that a selection has been made of the option to interrupt the message to accept the call: stopping both capture of the message and playback of the message, and presenting, to the first and second users at the first and second client devices, a digital call between the first and second users.

Example 20. The communication system of example 19, wherein the call comprises one or more of audio and video media, and the message comprises one or more of audio and video media.

Example 21. The communication system of any of examples 19-20, wherein the digital call between the first and second users is presented with a default call establishment using a standard call protocol.

Example 22. The communication system of any of examples 19-21, wherein the second plurality of options comprises one or more options to: transfer the call to a third party, start a conference call, report a call to one or more authorities, add the call to a block list, and flag the call as a spam or fraud call.

Example 23. The communication system of any of examples 19-22, wherein the one or more processors are further configured to perform the operations of: if the system determines that a selection has been made of the option to interrupt the message to reject the call: stopping playback of the message to the first user, and disengaging the user from the screening of the message and the notification of the incoming call.

Example 24. The communication system of example 23, wherein the one or more processors are further configured to perform the operation of: stopping the capture of the message upon the second user completing the capturing of the message.

Example 25. The communication system of example 24, wherein the one or more processors are further configured to perform the operation of: notifying the user of an option to be presented with at least the remainder of the message.

Example 26. The communication system of any of examples 19-25, wherein presenting the message to the first user comprises playing back media of the message to the first user at the first device as it is being captured at the second device.

Example 27. The communication system of any of examples 19-26, wherein presenting the message to the first user comprises, as the message is being captured at the second device: generating, in real time, a transcript of the message; and presenting, in real time, the transcript of the message to the first user at the first device.

Example 28. The communication system of any of examples 19-27, wherein the one or more processors are further configured to perform the operation of: concurrent to presenting the prompt for capturing the message to the second user at the second client device, presenting a notification to the first user that the prompt is playing for the second user.

Example 29. The communication system of any of examples 19-28, wherein the second plurality of options further comprises one or more options to: interrupt the message to reject the call and delete the message, interrupt the message to reject the call and save the message, interrupt the message to accept the call and delete the message, and interrupt the message to accept the call and delete the message.

Example 30. The communication system of any of examples 19-29, wherein presenting the message to the first user as it is being captured at the second device is performed at least in part using a Private Branch Exchange (PBX) system.

Example 31. The communication system of any of examples 19-30, wherein the one or more processors are further configured to perform the operations of: capturing a media stream of the message; duplicating the media stream in real time; and presenting the duplicated media stream to the first user at the first device in real time.

Example 32. The communication system of any of examples 19-31, wherein the one or more processors are further configured to perform the operation of: bypassing the second plurality of options to automatically reject the call based on one or more rejection criteria.

Example 33. The communication system of example 32, wherein one of the rejection criteria comprises identifying a preference of the first user to reject all calls comprising one or more specified attributes.

Example 34. The communication system of example 33, wherein the specified attributes comprise one or more of: the phone number associated with the call being on a list of phone numbers to automatically reject; the area code associated with the call being on a list of area codes to automatically reject; and the call being determined to meet or exceed a confidence threshold for being classified as spam, fraud, or a spoofed call.

Example 35. The communication system of any of examples 19-34, wherein the one or more processors are further configured to perform the operation of: presenting the first user with one or more user interface (UI) components for playing back at least a subset of the message.

Example 36. The communication system of any of examples 19-35, wherein the first device and the second device are configured to initiate and receive digital calls using a real-time communication protocol.

Example 37. A non-transitory computer-readable medium comprising: instructions for presenting, to a first user of a first client device capable of receiving digital calls, a notification of an incoming call from a second user of a second client device and a plurality of options for managing the call; instructions for receiving, from the first client device, a selection of an option to screen the call; in response to the first user selecting to screen the call, instructions for presenting, to the second user at the second client device, a prompt for capturing a message; instructions for presenting a message to the first user as the second client device captures the message from the second user; while the message is being presented to the first user, instructions for presenting, to the first user, a second plurality of options comprising one or more of: interrupting the message to accept the call, and interrupting the message to reject the call; and if the system determines that a selection has been made of the option to interrupt the message to accept the call: instructions for stopping both capture of the message and playback of the message, and instructions for presenting, to the first and second users at the first and second client devices, a digital call between the first and second users.

Example 38. The non-transitory computer-readable medium of example 37, wherein the call comprises one or more of audio and video media, and the message comprises one or more of audio and video media.

Example 39. The non-transitory computer-readable medium of any of examples 37-38, wherein the digital call between the first and second users is presented with a default call establishment using a standard call protocol.

Example 40. The non-transitory computer-readable medium of any of examples 37-39, wherein the second plurality of options comprises one or more options to: transfer the call to a third party, start a conference call, report a call to one or more authorities, add the call to a block list, and flag the call as a spam or fraud call.

Example 41. The non-transitory computer-readable medium of any of examples 37-40, further comprising: if the system determines that a selection has been made of the option to interrupt the message to reject the call: stopping playback of the message to the first user, and disengaging the user from the screening of the message and the notification of the incoming call.

Example 42. The non-transitory computer-readable medium of example 41, further comprising: stopping the capture of the message upon the second user completing the capturing of the message.

Example 43. The non-transitory computer-readable medium of example 42, further comprising: notifying the user of an option to be presented with at least the remainder of the message.

Example 44. The non-transitory computer-readable medium of any of examples 37-43, wherein presenting the message to the first user comprises playing back media of the message to the first user at the first device as it is being captured at the second device.

Example 45. The non-transitory computer-readable medium of any of examples 37-44, wherein presenting the message to the first user comprises, as the message is being captured at the second device: generating, in real time, a transcript of the message; and presenting, in real time, the transcript of the message to the first user at the first device.

Example 46. The non-transitory computer-readable medium of any of examples 37-45, further comprising: concurrent to presenting the prompt for capturing the message to the second user at the second client device, presenting a notification to the first user that the prompt is playing for the second user.

Example 47. The non-transitory computer-readable medium of any of examples 37-46, wherein the second plurality of options further comprises one or more options to: interrupt the message to reject the call and delete the message, interrupt the message to reject the call and save the message, interrupt the message to accept the call and delete the message, and interrupt the message to accept the call and delete the message.

Example 48. The non-transitory computer-readable medium of any of examples 37-47, wherein presenting the message to the first user as it is being captured at the second device is performed at least in part using a Private Branch Exchange (PBX) system.

Example 49. The non-transitory computer-readable medium of any of examples 37-48, further comprising: capturing a media stream of the message; duplicating the media stream in real time; and presenting the duplicated media stream to the first user at the first device in real time.

Example 50. The non-transitory computer-readable medium of any of examples 37-49, further comprising:

bypassing the second plurality of options to automatically reject the call based on one or more rejection criteria.

Example 51. The non-transitory computer-readable medium of example 50, wherein one of the rejection criteria comprises identifying a preference of the first user to reject all calls comprising one or more specified attributes.

Example 52. The non-transitory computer-readable medium of example 51, wherein the specified attributes comprise one or more of: the phone number associated with the call being on a list of phone numbers to automatically reject; the area code associated with the call being on a list of area codes to automatically reject; and the call being determined to meet or exceed a confidence threshold for being classified as spam, fraud, or a spoofed call.

Example 53. The non-transitory computer-readable medium of any of examples 37-52, further comprising: presenting the first user with one or more user interface (UI) components for playing back at least a subset of the message.

Example 54. The non-transitory computer-readable medium of any of examples 37-53, wherein the first device and the second device are configured to initiate and receive digital calls using a real-time communication protocol.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
presenting a notification of an incoming video call and a plurality of options for managing the incoming video call;
receiving a selection of an option to screen the incoming video call;
presenting a video message corresponding to the incoming video call, a real-time transcript synchronized with the video message as the video message is being captured, and an option to start a conference call to include multiple participants as the video message is being captured;
receiving a selection of an option to interrupt the video message;
stopping playback of the video message;
instantiating a video call when the selection is to accept the incoming video call; and
deleting the video message when the selection is to reject the incoming video call;
wherein presenting the video message and the real-time transcript as the video message is captured comprises:
presenting, on a user interface of a client device, the video message and a transcript that is generated and displayed in real-time, such that the transcript is updated and displayed as the video message is recorded, and wherein a user is presented with an option to accept or reject the incoming video call at any point during the real-time playback and transcript display.

2. The method of claim 1, wherein the incoming video call is presented with a default call establishment using a standard call protocol.

3. The method of claim 1, further comprising:
presenting one or more options to: transfer the incoming video call to a third party, report the incoming video call to one or more authorities, add the incoming video
call to a block list, and flag the incoming video call as
a spam or fraud call.

4. The method of claim 1, further comprising:
receiving a selection to interrupt the video message to
reject the incoming video call;
stopping playback of the video message; and
disengaging the notification of the incoming video call.

5. The method of claim 4, further comprising:
stopping the capture of the video message upon comple-
tion of the capturing of the video message.

6. The method of claim 5, further comprising:
providing notification of a remainder of the video mes-
sage.

7. The method of claim 1, wherein presenting the video
message comprises, as the video message is being captured:
presenting one or more user interface (UI) components for
playing back at least a subset of the video message.

8. The method of claim 1, further comprising:
presenting a notification that a prompt is playing for a
caller of the incoming video call.

9. The method of claim 1, further comprising:
presenting one or more options to: interrupt the video
message to reject the video call and save the video
message, interrupt the video message to accept the
video call and delete the video message, and interrupt
the video message to accept the video call and save the
video message.

10. The method of claim 1, wherein presenting the video
message as it is being captured is performed at least in part
using a Private Branch Exchange (PBX) system.

11. The method of claim 1, further comprising:
capturing a media stream of the video message;
duplicating the media stream in real time; and
presenting the duplicated media stream in real time.

12. The method of claim 1, further comprising:
automatically rejecting the incoming video call based on
one or more rejection criteria.

13. The method of claim 12, wherein one of the rejection
criteria comprises identifying a preference to reject all
incoming video calls comprising one or more specified
attributes.

14. The method of claim 13, wherein the specified attri-
butes comprise one or more of: a phone number associated
with the incoming video call being on a list of phone
numbers to automatically reject; an area code associated
with the incoming video call being on a list of area codes to
automatically reject; and the incoming video call being
determined to meet or exceed a confidence threshold for
being classified as spam, fraud, or a spoofed call.

15. A communication system comprising;
one or more processors configured to:
present a notification of an incoming video call and a
plurality of options for managing the video call;
receive a selection of an option to screen the incoming
video call;
present a video message corresponding to the incoming
video call, a real-time transcript synchronized with
the video message as the video message is being
captured, and an option to start a conference call to
include multiple participants as the video message is
being recorded;
receive a selection of an option to interrupt the video
message;
stop playback of the video message;

instantiate a video call when the selection is to accept
the incoming video call; and
delete the video message when the selection is to reject
the incoming video call;
wherein the one or more processors present the video
message and the real-time transcript as the video
message is captured, the one or more processors
configured to:
present, on a user interface of a client device, the
video message and a transcript that is generated
and displayed in real-time, such that the transcript
is updated and displayed as the video message is
recorded, and wherein a user is presented with an
option to accept or reject the incoming video call
at any point during the real-time playback and
transcript display.

16. The communication system of claim 15, wherein the
one or more processors are further configured to:
present one or more user interface (UI) components for
playing back at least a subset of the video message.

17. The communication system of claim 15, wherein
devices associated with the incoming video call are config-
ured to initiate and receive video calls using a real-time
communication protocol.

18. A non-transitory computer-readable medium storing
instructions operable to cause one or more processors to
perform operations comprising:
presenting a notification of an incoming video call and a
plurality of options for managing the video call;
receiving a selection of an option to screen the incoming
video call;
presenting a video message corresponding to the incom-
ing video call, a real-time transcript synchronized with
the video message as the video message is being
captured, and an option to start a conference call to
include multiple participants as the video message is
being captured;
receiving a selection of an option interrupt the video
message;
stopping playback of the video message;
instantiating a video call when the selection is to accept
the incoming video call; and
deleting the video message when the selection is to reject
the incoming video call;
wherein presenting the video message and the real-time
transcript as the video message is captured comprises:
presenting, on a user interface of a client device, the
video message and a transcript that is generated and
displayed in real-time, such that the transcript is
updated and displayed as the video message is
recorded, and wherein a user is presented with an
option to accept or reject the incoming video call at
any point during the real-time playback and tran-
script display.

19. The non-transitory computer-readable medium of
claim 18, wherein the incoming video call is presented with
a default call establishment using a standard call protocol.

20. The non-transitory computer-readable medium of
claim 18, wherein the operations further comprise:
presenting one or more options to: transfer the incoming
video call to a third party, report the incoming video
call to one or more authorities, add the incoming video
call to a block list, and flag the incoming video call as
a spam or fraud call.

* * * * *